J. E. WOODBURY.
COMBINED FINDING AND FOCUSING MECHANISM FOR CAMERAS.
APPLICATION FILED NOV. 6, 1912.
1,238,473.
Patented Aug. 28, 1917.
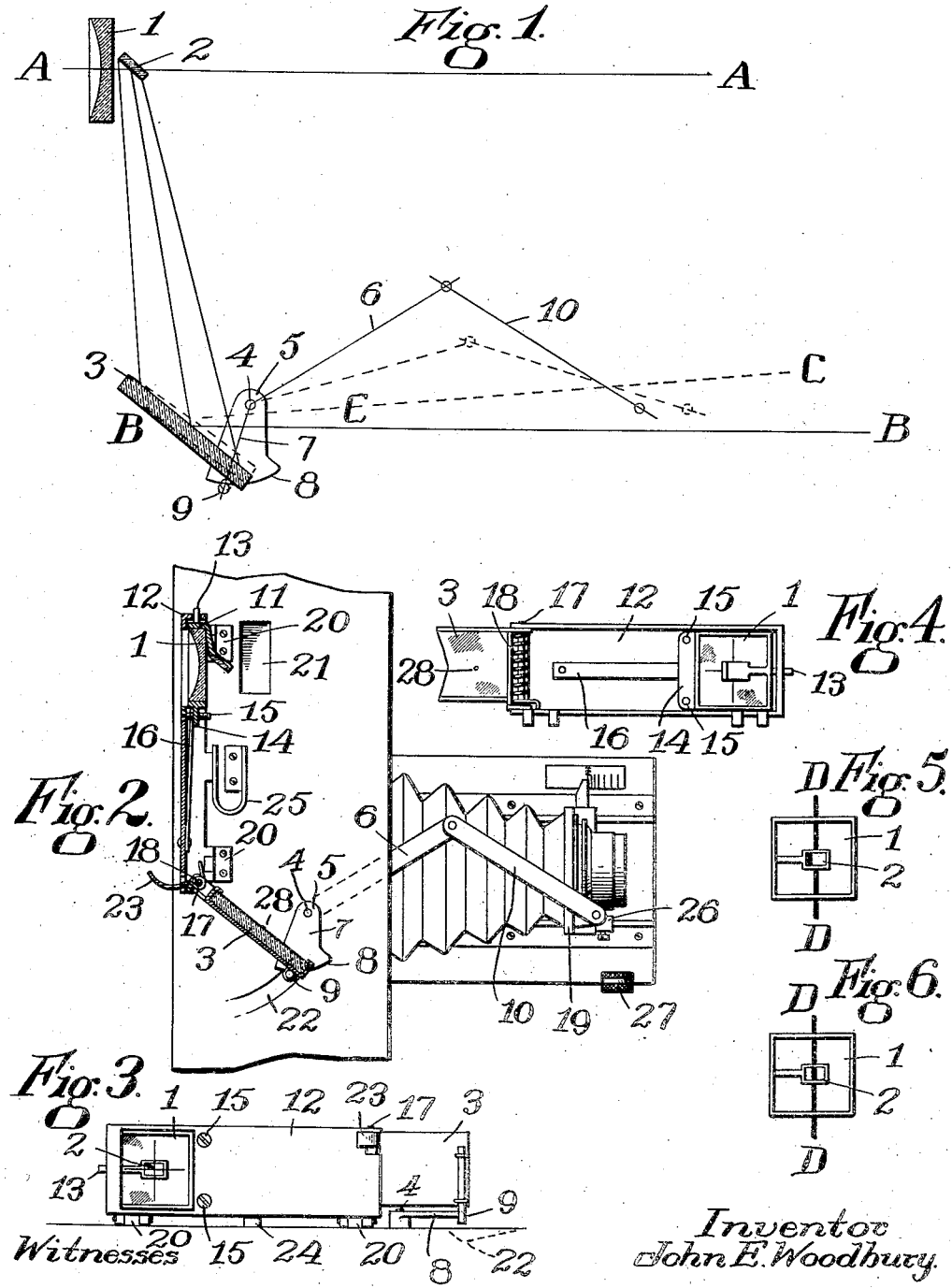
Inventor
John E. Woodbury.
Witnesses
R. D. Tolman
Penelope Comberbach
By Ralph E. Atherton.
Attorney

UNITED STATES PATENT OFFICE.

JOHN E. WOODBURY, OF WORCESTER, MASSACHUSETTS.

COMBINED FINDING AND FOCUSING MECHANISM FOR CAMERAS.

1,238,473.     Specification of Letters Patent.     Patented Aug. 28, 1917.

Application filed November 6, 1912. Serial No. 729,772.

*To all whom it may concern:*

Be it known that I, JOHN E. WOODBURY, a citizen of the United States, residing at Worcester, in the county of Worcester and Commonwealth of Massachusetts, have invented a new and useful Improvement in a Combined Finding and Focusing Mechanism for Cameras, of which the following, together with the accompanying drawing, is a specification.

My invention relates to a combined finding and focusing mechanism for cameras and one of its objects is to provide, in connection with a finder, mechanism to be operated by the movement of the lens in obtaining a position suitable for focusing the image of an object upon a plate or film within the camera, said mechanism acting to distort the image seen in the finder at all times except when the lens is in position to focus the corresponding image accurately upon the plate or film within the camera.

Another object of the invention is to provide a compact finding and focusing mechanism of this class. In accomplishing this object the mechanism has been constructed so as to fold closely against one face of the camera when not in use, with the advantage that in its folded position it is more convenient to carry about and is also less liable to damage.

Another object of the invention is to provide means whereby the mechanism may be quickly and easily readjusted in case it loses its accuracy of adjustment while in use.

Further objects and advantages will appear from the following description taken in connection with the accompanying drawing, in which Figure 1 is a diagrammatic view illustrating the principle of the invention; Fig. 2 is a plan view partly in section of a portion of the top of a folding camera provided with a finding and focusing mechanism in accordance with my invention; Fig. 3 is a rear view of the mechanism mounted outside the camera, as shown in Fig. 2; Fig. 4 is a front view of the mechanism shown in Fig. 3, a portion at the left being broken away; Fig. 5 is a view of an image in the finder as the image looks when the lens is out of correct focusing position; and Fig. 6 is a view similar to that shown in Fig. 5 except that it shows the image as it appears when the lens is in correct focusing position.

Like reference characters indicate similar parts in the different figures.

In the diagrammatic view shown in Fig. 1 the lens 1 serves as a direct view finder in a manner well known to those familiar with the art. In front of the lens 1 is a small mirror 2 placed at an angle of 45°, or thereabout, to the axis of the lens. At one side of this lens and mirror is another mirror 3 with its face parallel, or nearly so, to the face of the mirror 2. The reflecting surfaces of the two mirrors face each other. The lens 1 and the mirror 2 are fixed in position, but the mirror 3 is adjustable about a vertical axis at its edge nearest the lens. Mounted upon a pivot 4 is a lever 5 including arms 6 and 7, the free end of the arm 7 carrying a cam 8 which engages a pin 9 attached to the adjustable mirror 3 so that this lever 5 and cam 8 may control the position of this mirror.

To the free end of the arm 6 is attached one end of a link 10, the other end of this link being pivotally attached to some portion of the camera which moves forwardly and backwardly with the camera lens as the said lens is adjusted in position to obtain a correct focus. The axis of the lens 1 coincides with the line A—A so that, in viewing a scene to be photographed the rays of light from the center of the scene will pass along this line A—A. If the scene be a distant one, several hundred feet from the camera for instance, the rays of light from the center of the scene will also pass along the line B—B, this line being practically parallel to the line A—A. The small mirror 2 is located with its center approximately at the line A—A so as to intercept a small amount of light which would otherwise form the central portion of the image seen through the lens 1. The lens and the two mirrors are, however, so adjusted in relative position that the rays of light traveling along the line B—B are reflected first to the mirror 2 and from there along the line A—A through the lens 1.

The lines A—A and B—B point to the same portion of the scene to be photographed and, therefore, the rays of light traveling along these two lines are exactly similar and, for this reason, it is obvious that the light reflected by the two mirrors will exactly and symmetrically fill in the small portion of the directly formed image which was blotted out by the mirror 2. If, now, the adjustable mirror 3 be changed in position, it is clear that the image reflected thereby through the lens 1 by way of the mirror 2 will be shifted in position relatively to that portion of the image which is formed directly. It will be seen that, when the camera is pointed toward a distant object, all that is necessary in order to obtain a proper focus is to draw out the lens until the cam 8 has moved the mirror 3 into such position that the center of the image seen in the mirror 2 through the lens 1 is in exact register with the remaining portion of the image which is directly formed.

Suppose, now, that the line C—C intercepts the line A—A at a point ten feet from the camera. The shape of the cam 8 is such that, with the lens changed in position so as to focus this nearer object properly, the mirror 3 will be moved into a position, as shown in dotted lines, to reflect the light coming along this line C—C through the lens 1 by way of the mirror 2 in a manner exactly similar to that which has been already described.

In shaping the cam 8, the cam, together with the remainder of the finding and focusing mechanism which has been described, may be mounted upon the camera while the working edge of the cam is still unfinished. The camera may then be focused upon a suitable object at a known distance from the camera by means of a focusing screen located within the camera in the usual manner. The working edge of the cam, at the point which contacts with the pin 9, may then be carefully worked down with a fine file and oilstone, or other suitable tools, until the adjustable mirror 3 is allowed to assume such position that the portions of the image seen in the finder coincide, as shown in Fig. 6. This operation may then be repeated, the object upon which the camera is focused being located at different distances from the camera, until a sufficient number of points along the edge of the cam have been worked down to make its working edge a practically smooth curve.

Thus far the lens may be positioned to obtain accurate focusing power for very distant objects and for objects ten feet from the camera. In like manner the mirror 3 is adjusted in position by moving the lens of the camera so that objects at all distances within the range of the camera may be properly focused merely by moving the lens of the camera, observing the direct and reflected portions of the image through the lens 1 until these two portions register exactly.

In Fig. 5 is shown a view of the lens 1 and the mirror 2 as seen through the lens 1. The line D—D represents any object, such as a flagpole, to be photographed, but the fact that the portion of the image shown in the mirror 2 is not in line with those portions seen directly through the lens 1 shows that the camera lens is not in position to focus properly the rays of light from the object upon the plate or film within the camera.

Fig. 6 shows the appearance of the image through the lens 1 when the camera lens has been moved into proper focusing position, the cam 8, controlled by the position of the camera lens, having moved the adjustable mirror 3 so that the reflected portion of the image shown in the mirror 2 exactly registers with the unreflected portions thereof.

Referring now to Figs. 2, 3 and 4, which indicate one construction by means of which my invention may be practised, the lens 1 serves in a common and well known manner as a direct view finder. The small mirror 2 is supported in angular position in front of the lens 1 by a small arm extending from and rigidly attached to or integral with a frame 11 holding the lens 1. The frame 11 with the lens 1 and mirror 2 carried thereby is supported at three points in the main frame or support 12. One side of this frame 11 carries a pin 13 which fits snugly in a small hole provided therefor in the end of the frame 12. The opposite side of the frame 11 is provided with a flange 14 which is engaged by a pair of screws 15 having their heads seated in the frame 12. Attached to the front face of the frame 12 is a spring 16, the free end of which presses against the rear face of the flange 14 in order to coöperate with the screws 15 in holding the lens 1 and mirror 2 accurately in place. It will be seen that, within reasonable limits, the positions of the lens 1 and mirror 2 may be accurately adjusted in any direction by turning one or the other, or both, of the screws 15.

The mirror 3 is mounted upon the pivot 17 and carries the pin 9, projecting below its lower edge, to engage the cam 8 so that this cam may control the angular position of the mirror 3 about the pivot 17. A spring 18 holds the pin 9 against the cam 8. The cam 8 and the arm 7 are each rigidly attached to a shaft passing through the top of the camera, this cam 8 and arm 7 together with the shaft connecting them and the arm 6 constituting the lever 5. The free end of the arm 6 is connected by the link 10 to the lens board 19, or any other suitable portion of the camera which moves with the camera lens.

The parts of the structure which have been described correspond to those previously described in connection with the diagrammatic view shown in Fig. 1 and the same reference characters have been used where possible;

and from the description given in connection with Fig. 1, the principle of the operation of the actual mechanism which has just been described will be apparent.

In order that my device may be folded into as convenient form as possible when not in use, the main frame or support 12 carrying the lens 1 and the mirrors 2 and 3 is attached to the top of the camera box by hinges 20. By rotating the mirror 3 about its pivot 17 and into the plane of the frame 12, the frame 12 and the parts carried thereby may be folded down forwardly onto the top of the camera box. A small opening or recess 21 in the top of the camera box receives the small mirror 2 when the device is in folded position. A suitable track or cam way 22 is provided in the surface of the camera box under the pin 9 so that, as the frame 12 is tipped forwardly about the hinges 20, the lower end of this pin 9 will engage the cam way 22, the cam way forcing the pin rearwardly and upwardly as the frame 12 is tipped until finally the mirror 3 has been rotated into the plane of the frame 12. This is a matter of considerable convenience, allowing one to fold the frame 12 against the top of the camera without first having to draw back the mirror 3, the cam way 22 acting automatically to accomplish this result.

A short arm 23 extends rearwardly from the pivoted edge of the mirror 3 to provide manually operable means for accomplishing the same result for which the cam way 22 is intended. A single forward pressure against this arm 23 will rotate the mirror 3 into the plane of the frame 12 and will also tip the frame 12 down onto the top of the camera box. In order to hold the frame 12 with the lens and mirrors carried thereby in proper operative position, a small stop 24 is provided under the rear edge thereof to limit its motion as it is opened, and a spring 25 attached to the top of the camera box presses against the lower front edge of this frame to hold it either against the stop 24 when in open position, or against the top of the camera box when in folded position.

A stop 26 fastened securely to the track carrying the lens board serves to determine accurately the position of the lens for properly focusing the images or other distant objects, that is, objects more than one hundred feet, or thereabout, from the camera. By means of this stop 26 the accuracy with which the device is performing its function may be tested very quickly and easily. By drawing out the lens until the stop 26 is reached, it is known that the lens is in proper position to focus properly images or distant objects, and if, now, the direct and reflected portions of the image of such objects as seen through the lens 1 register accurately as shown in Fig. 6, then the device is in proper adjustment; but if these two portions of the image do not register accurately as shown in Fig. 5, then the device is out of adjustment. When it is found in this way that readjustment is necessary, the positions of the lens 1 and mirror 2 may be adjusted by turning one or the other, or both, of the screws 15 until the two portions of the image seen through the lens 1 register exactly. Having provided the proper adjustment for distant objects, or objects at any known distance, and the shape of the cam having been accurately designed, then the device will be in proper adjustment for all other distances within the range of the camera. In ordinary use the camera lens is drawn out until the stop 26 is reached and then, if the object to be photographed is less than one hundred feet or so from the camera, the ordinary rack and pinion controlled by the thumb nut 27 is used.

The image seen through a direct view finder, such as the lens 1, can represent accurately the scene which the camera is in position to photograph only when the image is being viewed exactly along the axis of the view finder. Such image is approximately correct if viewed from some other point and it may be that it is sufficiently accurate for some purposes if viewed from any point from which it may be reasonably clearly seen.

It is many times desirable and often necessary, however, to see in the view finder the exact image which the camera is in position to take. A small spot 28 is, therefore, placed upon the center of the mirror 3 and the lens 1 is provided with a cross in the usual manner. When this spot 28 is seen exactly at the intersection of the lines of the cross on the lens 1, it is certain that the scene which the camera is in position to photograph is indicated accurately by the image shown in the view finder. While it is preferable to place the spot 28 upon the mirror 3, the same result is accomplished by placing it upon the mirror 2, although the latter arrangement is not as satisfactory, being less sensitive.

An important feature of the invention resides in the location of the lens 1 and both the mirrors 2 and 3 upon the same rigid support, the parts being much easier to keep in adjustment than would be the case were the mirrors mounted on separate supports.

The mirror 3, rather than the mirror 2, is arranged to be adjusted in position in accordance with the focusing movements of the lens because a given angular movement of the mirror 3 will shift the reflected image, as seen through the lens 1, to a greater extent than would the same angular displacement of the mirror 2 and the device is therefore made considerably more reliable. This is for the reason that the greater the movement of the mirror, the more accurately can its movements be controlled and the less effect will any inaccuracy in the shape of the cam or other controlling mechanism have.

While I have shown and described in detail one form of mechanism illustrating the principle of my invention, I do not wish to be limited to these details as it is obvious that certain changes may be made without departing from the spirit of the invention; but what I claim as new and desire to secure by Letters Patent is:

1. In a focusing device for cameras, the combination with an optical group constituting a distance finder and comprising two reflectors adapted to jointly form a complete image and means movable with the camera lens for varying the relationship of light rays that produce the components of said image, of a support for one of the reflectors adjustably coöperating therewith at two points to rock it transversely of its general plane to different positions about a third point as a center.

2. In a focusing device for cameras, the combination with an optical group constituting a distance finder and comprising two reflectors adapted to jointly form a complete image and means movable with the camera lens for varying the relationship of light rays that produce the components of said image, of a support for one of the reflectors comprising a universal pivot and two adjusting screws by means of which latter the reflector may be turned transversely of its general plane on the pivot about different axes.

3. In a focusing device for cameras, the combination with an optical group constituting a distance finder and comprising two reflectors and a lens fixed with relation to one of them, the reflectors being adapted to jointly form a complete image in the lens, and means movable with the camera lens for varying the relationship of light rays that produce the components of said image, of a common support for the finder lens and the relatively fixed reflector comprising a universal pivot and two independent adjusting devices by means of which latter the said reflector and lens may be turned on the pivot about different axes transverse to the axis of the finder lens.

4. In combination, a camera, a frame, and a finder and two mirrors mounted on the frame, one of the mirrors being pivoted thereto and normally at an angle to the plane of the frame, the frame being pivoted to the camera to fold toward one of its faces, and means to rotate the pivoted mirror into the plane of the frame to permit the frame to be folded.

5. In combination, a camera, a frame, and a finder and two mirrors mounted on the frame, one of the mirrors being pivoted thereto and normally at an angle to the plane of the frame, the frame being pivoted to the camera to fold toward one of its faces, and automatic means to rotate the pivoted mirror into the plane of the frame to permit the frame to be folded.

6. In combination, an exteriorly arranged camera, a frame, pivoted to the camera to fold toward one face thereof, and finding and focusing mechanism mounted upon the frame.

7. In combination, a camera, a frame, a finder, a mirror within the field of view of said finder and a second mirror without said field of view, said finder and mirrors being mounted on said frame, one of said mirrors being adjustable and being connected to the camera lens to be adjusted in position as the camera lens is moved in focusing, the frame being pivoted to the camera to rotate into and out of operative position.

8. In combination, a camera, a frame pivoted to the camera, finding mechanism mounted on the frame, focusing mechanism pivoted to the frame and normally at an angle to the plane of the frame, the focusing mechanism being rotatable into the plane of the frame to permit the frame to be folded toward a face of the camera.

9. In combination, a camera, a frame pivoted to the camera, finding mechanism mounted on the frame, focusing mechanism pivoted to the frame and normally at an angle to the plane of the frame, and means for rotating the focusing mechanism into the plane of the frame to permit the frame to be folded toward a face of the camera.

10. In combination, a camera, a frame pivoted to the camera, finding mechanism mounted on the frame, focusing mechanism pivoted to the frame and normally at an angle to the plane of the frame, and automatic means for rotating the focusing mechanism into the plane of the frame to permit the frame to be folded toward a face of the camera.

11. In a focusing device for cameras, the combination with a camera body, camera lens and lens carriage, of a distance finder mounted exteriorly of the camera body and consisting of an optical group including a variable element and connections extending within the camera body between the said variable element and the lens carriage.

12. In a focusing device for cameras, the combination with a camera body, camera lens and lens carriage, of a distance finder mounted on the camera body and consisting of an optical group including a variable element and detachable connections between the said variable element and the lens carriage.

13. In a focusing device for cameras, the combination with a camera body, of a focusing finder embodying a lens and two angle mirrors adapted to jointly direct an image to the lens, one of the mirrors being foldable to a position in the plane of the lens.

14. In a focusing device for cameras, the combination with a camera body, of a focusing finder mounted thereon and embodying a lens having an operative position at an angle to a wall of the body and a folded position against said wall and also embodying two angle mirrors adapted to jointly direct an image to the lens, one of the mirrors being foldable to a position in the plane of the lens.

JOHN E. WOODBURY.

Witnesses:
PENELOPE COMBERBACH,
NELLIE WHALEN.